United States Patent [19]

Lim

[11] 4,442,141

[45] Apr. 10, 1984

[54] TREATMENT OF CELLULOSE ACETATE BUTYRATE CONTACT LENSES

[75] Inventor: Drahoslav Lim, San Diego, Calif.

[73] Assignee: Barnes-Hind/Hydrocurve, Inc., Sunnyvale, Calif.

[21] Appl. No.: 437,976

[22] Filed: Nov. 1, 1982

[51] Int. Cl.³ .......................... B05D 1/18; G02B 1/04; G02B 1/10; G02B 3/00
[52] U.S. Cl. .................................................... 427/164
[58] Field of Search ........................................ 427/164

[56] References Cited

U.S. PATENT DOCUMENTS 4,168,112 9/1979 Ellis et al. ........................ 427/164 X

*Primary Examiner*—James R. Hoffman

[57] ABSTRACT

This disclosure describes the treatment of cellulose acetate butyrate contact lenses which are rendered hydrophilic by contacting said lenses with a treating agent which increases the hydrophilicity of said lenses. The treating agent is ammoniacal salt, alkali-metal hydroxide, strong mineral acid, benzene sulfonic acid, alkali metal borohydride or organometallic compound.

12 Claims, No Drawings

TREATMENT OF CELLULOSE ACETATE BUTYRATE CONTACT LENSES

BACKGROUND OF THE INVENTION

This invention relates to gas-permeable contact lenses. More particularly, the present invention relates to cellulose acetate butyrate contact lenses which have been rendered more hydrophilic and, hence, have improved surface wettability and in some cases improved soiling resistance.

BRIEF SUMMARY OF THE INVENTION

Present day contact lenses are of the following general types: the so-called hard lenses usually containing polymethylmethacrylate which is hydrophobic in nature; the moderately hydrophilic gas-permeable lenses one type of which is composed of cellulose acetate butyrate, and the soft lenses which are at least partially hydrophilic and may be composed of crosslinked ethylene glycol monomethacrylate.

Semi-rigid, gas-permeable contact lenses of generally concave-convex cross-section formed of transparent, optically clear cellulose acetate butyrate are known to be art. See, for example, U.S. Pat. No. 3,900,250.

The present invention is based upon the discovery that the moderately hydrophilic properties of cellulose acetate butyrate contact lenses can be greatly improved by an increase in wettability and, hence, comfort of the lens to the wearer without adversely affecting the dimensional stability or light transmission quality of the treated lenses. The resulting contact lenses also retain their gas permeability which is an important factor for contact lenses as it facilitates the ready interchange of oxygen and carbon dioxide gases between the cornea and the surrounding atmosphere, thereby permitting the normal and essential metabolic processes to continue within the cornea. The present invention accomplishes these desirable results by treatment of the lenses, after machining and polishing fabrication, by one of several procedures detailed more particularly below, the net result being an increase in the surface wettability of the lenses.

In one embodiment of the present invention, this desirable result may be achieved by surface hydrolysis of the lenses. This reaction regenerates the hydroxyl groups of the cellulose which may be readily accomplished by the action of bases, such as ammonia, for example, as described more in detail hereinafter, or by the use of alkali metal hydroxides such as sodium hydroxide or by treatment with acids such as a strong mineral acid e.g. hydrochloric acid, sulfuric acid, etc. or by benzene sulfonic acid. An extremely important factor of this aspect of the present invention is that this process results in confining the reaction to the very surface of the lenses only.

In another embodiment of the present invention, the desired result of increased surface wettability of the lenses may be accomplished by surface reduction of the ester groups of the cellulose by the use of complex hydrides such as sodium borohydride, for example, in water. The result of this reaction, after hydrolysis of the reaction product, is again regeneration of the hydroxyl groups of the cellulose.

In still another embodiment of the present invention, the surface reaction of the ester groups of the cellulose may be accomplished by treatment with organometallic compounds such as n-butyl lithium, in non-polar solvents such as pentane, for example. Hydrolysis of the reaction product also results in the regeneration of the cellulose hydroxyl groups.

In the most preferred embodiment of the present invention, the desirable result of surface wettability of the lenses may be accomplished by immersion of the lenses, after machining and fabrication, in an ammoniacal salt solution. This process involves the de-esterification of the cellulose acetate butyrate with subsequent regeneration of the cellulose on the lens surface and to some depth into the lens thereby exposing more hydroxyl groups on the surface and the lens is therefore rendered more hydrophilic with the result of an increase in surface wettability of the lenses exhibited by a lower contact angle.

In order to impart a charge to the surface of the lenses and to render the lenses even more hydrophilic compared to a hydroxylated surface, the hydroxyl groups regenerated by one or more of the procedures outlined above may be further reacted with substances like chloroacetic acid salts. The products of this reaction are salts of carboxymethyl derivatives of hydroxy compounds.

The most critical factor of all of the surface modifications of the lenses described above is the confining of the reaction to the very top layers of the lenses. An irregular surface reaction or deeper penetration of the reactant under the surface would adversely affect both the optical properties and shape of the lenses.

The surface modification of the cellulose acetate butyrate lenses will be described more in detail in conjunction with the surface hydrolysis by the use of an ammoniacal salt solution.

DETAILED DESCRIPTION OF THE INVENTION

In carrying out the present invention, the contact lenses composed of cellulose acetate butyrate are machined and polished in the customary way. Upon completion of the lens fabrication, and after cleaning the lenses in the usual manner by placing them in an ultrasonic cleaner with an appropriate cleaning solution such as, for example, 0.4% Alconox followed by rinsing in purified water, the lenses are immersed in an ammonia solution comprising a saturated sodium chloride solution prepared by mixing 370 grams sodium chloride, U.S.P. grade, per liter of deionized water with stirring until the sodium chloride no longer goes into solution, and to which is added 0.585 liters of ammonium hydroxide with an ammonia content of 27% by weight, or equivalent, to each 0.415 liters saturated sodium chloride solution. The ammonia concentration may vary over a wide range but a concentration of between about 10–18% provides for a fast and still controllable process. The ammonia concentration is preferably 14.0±0.5%. This can be readily accomplished by the addition of more saturated sodium chloride solution if the ammonia concentration is above the desired level or, if the ammonia concentration is below the desired amount, additional ammonium hydroxide may be added. The concentration of the strong non-associating electrolyte such as sodium chloride, potassium chloride, sodium sulfate, etc. should be maintained at the level which will help better to confine the reaction to the surface of the lenses. It is preferable to keep the concentration of the strong electrolyte high enough, preferably up to saturation, to maintain comfortably the concentration of ammonia at the level mentioned above. Obviously, sources of ammonia may be employed other than by the use of ammonium hydroxide as, for example, by bubbling ammonia through the salt solution, in order to maintain the ammonia concentration at a desired level, but the use of ammonium hydroxide is preferred as it offers a convenient way of attaining the desired concentration of ammonia.

After the desired ammonia concentration is reached and maintained for the requisite period of time, the lenses are soaked in the described ammoniacal salt solution for a sufficient period of time to soften the lens surface and increase surface wettability. Usually a period of time from a few to several hours, e.g. 48 hours, is sufficient to accomplish the desired improved wettability of the lenses.

The lenses are thereafter rinsed in tap water for a minimum of 8 hours and again rinsed with purified water. The lenses are thereafter immersed in a 4.0% solution of Alconox, cleaned in the ultrasonic cleaner and washed again in purified water.

Testing of the so-treated lenses has demonstrated that immersion in the ammoniacal salt solution does not adversely affect the safety or effectiveness of the lenses and makes the lenses more comfortable to the wearer by providing a more wettable surface as shown by the following wetting angle measurements:

The soak state wetting angle of contact lens material was measured using the Captured Bubble method. The first measurement is the average of ten bubbles measured left and right sides. The second number, in parentheses, is the standard deviation.

Reference: CLMA's (Tentative) Standard Method for Determining Wetting Angle.

TABLE 1

| CAPTURED BUBBLE WETTING ANGLES | | |
|---|---|---|
| | DISC 1 30 Hours | DISC 2 16 Hours |
| SOAK STATE | 18.3° (3.9°) | 13.2° (2.7°) |
| 1 WEEK SOAK STATE | 14.7° (1.0°) | 12.2° (0.6°) |

Average wetting angle of the treated two discs twenty measurements, is 13.5°.

The following table demonstrates that by subjecting the lenses to the described treatment, the lenses meet material specifications as to hardness and absorptivity. Test and control pieces were manufactured according to the standard acceptance procedures. Test pieces were treated with the described ammoniacal salt solution. Control pieces were exposed to buffered 0.9% saline for an equivalent time period. The same method of rinsing was used for both the test and control pieces.

TABLE 2

| HARDNESS Average of three readings/blank; twelve blanks/group | | |
|---|---|---|
| | BEFORE | AFTER |
| CONTROL BLANKS | 79 | 76 |
| TEST BLANKS | 79 | 76 |

The hardness decreased equally for the control blanks and test blanks after their respective treatments.

The refractive index was determined at 25° C. after treatment of the discs.

| | $n_D^{25°\ C.}$ |
|---|---|
| CONTROL | |
| 1 | 1.4739 |
| 2 | 1.4732 |
| TEST | |
| 3 | 1.4758 |
| 4 | 1.4754 |

| ABSORPTIVITY (LIGHT TRANSMISSION METHOD 010) | | |
|---|---|---|
| | BEFORE SOAK | AFTER SOAK |
| CONTROL | | |
| 1 | 0.195 | 0.181 |
| 2 | 0.155 | 0.145 |
| TEST | | |
| 3 | 0.189 | 0.175 |
| 4 | 0.172 | 0.165 |

All absorptivity values meet the current specification limit of 0.208 maximum. There is a slight improvement in light transmission indicated by lower absorptivity.

| ABSORPTIVITY AT 610nm (COLOR-METHOD 076) | | | |
|---|---|---|---|
| | BEFORE SOAK | AFTER SOAK | CHANGE |
| CONTROL | | | |
| 1 | 0.225 | 0.209 | −0.016 |
| 2 | 0.179 | 0.171 | −0.008 |
| TEST | | | |
| 3 | 0.219 | 0.212 | −0.007 |
| 4 | 0.198 | 0.185 | −0.013 |

Only two discs were measured and a meaningful standard deviation cannot be calculated. There is no difference between control and test discs.

As examples of other treatments in accordance with the present invention there may be mentioned the following:

As an example of sodium hydroxide hydrolysis the finished lenses are gently stirred in 20% solution of this reagent for four hours at room temperature. After the treatment, the lenses are washed as before.

As another example, the finished lenses are treated in a 5% water solution of sodium borohydride at room temperature for four days. The lenses are transferred into 1% hydrochloric acid and stirred gently until no bubbles of hydrogen are generated. Finally, the lenses are washed to a lasting neutral reaction. Sodium borohydride may be replaced by a faster reacting lithium borohydride.

In still another example, the finished lenses are treated in a 0.05 molar solution of n-butyl lithium in pentane for fifteen minutes at room temperature. The subsequent step consists of rinsing the lenses in pentane, stripping of the solvent in vacuum, and decomposing the reaction product in 1% hydrochloric acid for thirty minutes at room temperature. The lenses are washed in water to a lasting neutral reaction.

As a still further example, the lenses hydrophilized by one or more of the processes described above are treated in a solution of sodium chloroacetate and sodium hydroxide (116 g of sodium chloroacetate and 80 g of sodium hydroxide per one liter of solution) for two hours at a temperature below 30° C. After the treatment, the lenses are washed to a lasting neutral reaction.

Having thus described the invention, what is claimed is:

1. A process for rendering cellulose acetate butyrate contact lenses hydrophilic which comprises contacting said lenses with a treating agent for a period of time sufficient to increase the hydrophilicity of said lenses; wherein the treating agent is ammoniacal salt, alkali metal hydroxide, a strong mineral acid, benzene sulfonic acid, alkali metal borohydride, or organometallic compound.

2. The process of rendering cellulose acetate butyrate contact lenses hydrophilic which comprises contacting said lenses with an ammoniacal salt solution for a period of time sufficient to increase the surface wettability of said lenses.

3. The process as in claim 2 wherein the ammonia concentration is between about 10–18%.

4. The process as in claim 3 wherein the ammonia concentration is 14.0±0.5%.

5. The process as in claim 2 wherein the ammonia is present in the form of ammonium hydroxide.

6. The process as in claim 2 wherein the salt is a non-associating strong electrolyte.

7. The process as in claim 2 wherein the salt is saturated sodium chloride solution.

8. The process as in claim 1 wherein the treating agent is a solution of an alkali metal hydroxide.

9. The process as in claim 1 wherein the treating agent is sodium or lithium borohydride.

10. The process as in claim 9 wherein the organometallic compound is n-butyl lithium.

11. The process as in claim 1 wherein the treating agent is an organometallic compound.

12. The process as in claim 1 wherein additional hydrophilicity is imparted to the lens by further treatment of the said lenses with chloro- or bromoacetic acid salts in the presence of an alkali metal hydroxide.

* * * * *